United States Patent

[11] 3,593,266

[72] Inventor John R. Van Sickle
 Utica, Mich.
[21] Appl. No. 866,998
[22] Filed Oct. 16, 1969
[45] Patented July 13, 1971
[73] Assignee General Motors Corporation
 Detroit, Mich.

[54] DISC BRAKE WEAR MONITOR SYSTEM
 8 Claims, 3 Drawing Figs.
[52] U.S. Cl. .................................................. 340/52,
 340/240
[51] Int. Cl. ..................................................... B60q 1/44
[50] Field of Search .......................................... 340/52, 52
 A, 52 B, 240, 242; 200/82, 83

[56] References Cited
UNITED STATES PATENTS
3,374,323 3/1968 Peek et al. .................... 340/240 X

*Primary Examiner*—Alvin H. Waring
*Attorneys*—W. E. Finken and D. D. McGraw

ABSTRACT: A brake lining wear warning system in which passages are formed at a predetermined depth in the lining and connected to the engine intake manifold through a vacuum switch. The switch operates a warning indicator when there is insufficient vacuum in the passages. When the lining wears to open a passage to atmosphere, the vacuum switch is closed and the warning indicator is energized. By wiring the indicator and vacuum switch through the ignition switch, the system is self-tested each time the ignition switch is turned on and before the engine is started and vacuum is generated in the vacuum circuit.

PATENTED JUL 13 1971

3,593,266

INVENTOR.
John R. Van Sickle
BY
D. D. McGraw
ATTORNEY

DISC BRAKE WEAR MONITOR SYSTEM

The invention relates to a brake lining wear system and more particularly in one having a vacuum circuit for sensing brake lining wear and a vacuum switch for energizing a warning indicator when excessive lining wear has occurred.

A variety to monitoring systems have been developed for indicating brake lining wear. However, these systems are basically either mechanical noisemakers or involve an electrical contact in the brake lining for completing a circuit through the brake drum or disc. The noise generating systems do not provide a continuous output to the vehicle operator, and are not self-inspecting. Electrical systems involving contacts in the brake lining are sometimes difficult to maintain in an operating condition due to corrosion, and require somewhat complicated and expensive components to insure their fail-safe operation.

A system embodying the invention utilizes engine intake manifold vacuum applied to small wear-through monitor ports in the brake lining as signaling media. Under usual operating conditions, the entire vacuum system is closed and no continuous air flow occurs. The system is held under vacuum, causing a normally closed set of contacts in a vacuum switch to be held open, preventing the warning indicator from being energized. When the brake linings wear to the recommended replacement thickness, one or more of the monitor ports would be opened to atmosphere, causing the system pressure to change from the vacuum impressed thereon to atmospheric. This, in turn, allows the contacts in the vacuum switch to close and energize the warning indicator. The vacuum circuit preferably includes a metering orifice at the inlet which is connected to the vacuum source to insure sufficient pressure differential for reliable vacuum switch operation when a monitor port is worn through and connected to atmosphere.

IN THE DRAWING

Figure 1:
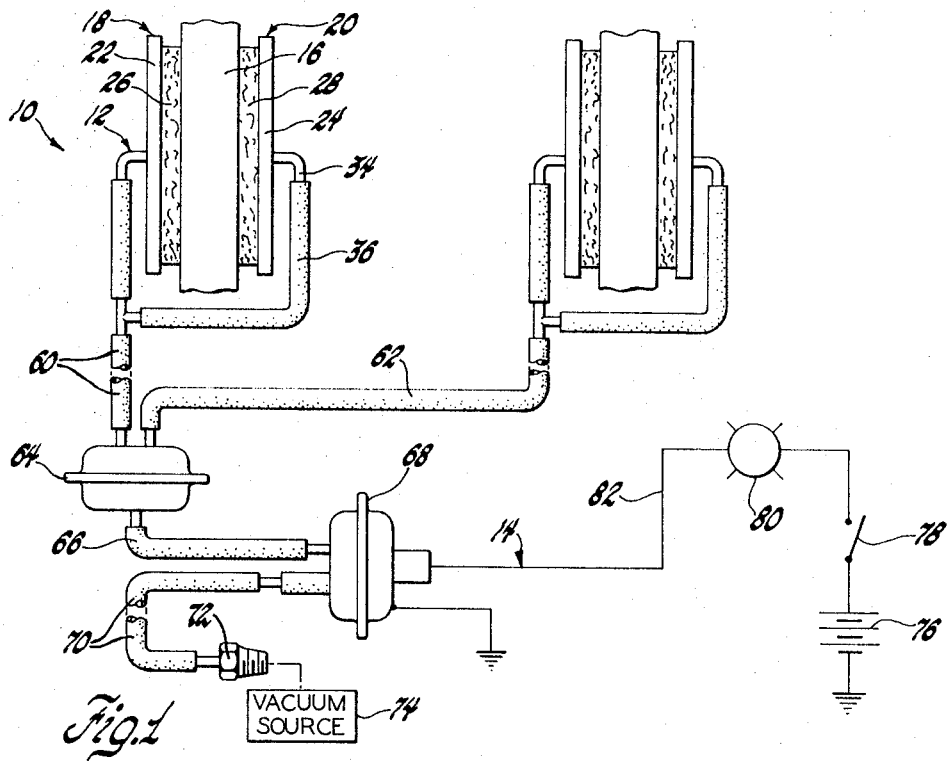
FIG. 1 is a schematic illustration of a system embodying the invention, with parts being broken away.

The brake lining wear warning system 10 of FIG. 1 includes a vacuum circuit 12 and an electrical circuit 14. The system is illustrated as being installed on a pair of disc brakes, but it may also be installed in other types of brakes having friction lining. The disc brakes are similar and, therefore, only one installation will be described in detail.

Figure 2:
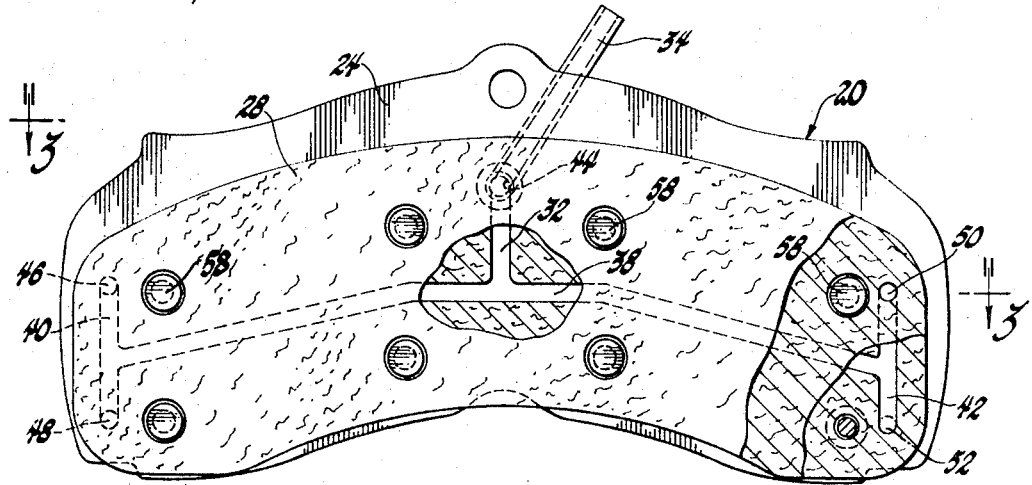
FIG. 2 is an elevation view of a brake shoe assembly for a disc brake and constructed to be utilized in the system of FIG. 1.
Figure 3:
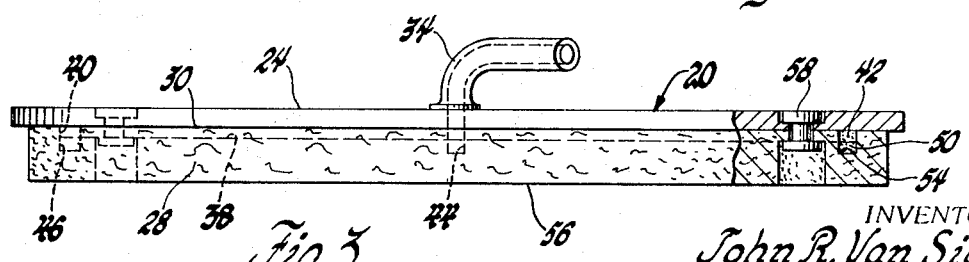
FIG. 3 is a view of the shoe assembly taken in the direction of arrows 3-3 of FIG. 2, and having parts broken away and in section.

The disc 16 has brake pad assemblies 18 and 20 on opposite sides thereof which are suitably mounted in a caliper housing, not shown, for frictionally engaging the disc in braking relation. Each pad assembly includes a backing plate 22, 24 and friction linings 26, 28. As is better seen in FIGS. 2 and 3, channellike passages are provided in the surface 30 of each lining which is in engagement with the associated backing plate. A typical passage configuration may be of the type illustrated in FIG. 2 in which the channel passage 32 is connected with a supply tube 34 extending through to the other side of the backing plate and to which the conduit 36 is connected. Channel 32 intersects in fluid communication with a longitudinally extending channel 38. This channel in turn connects with cross channels 40 and 42, which are respectively adjacent to the leading and trailing ends of the lining.

Monitor ports are suitably provided in fluid communication with the channels so that each monitor port is in fluid communication with tube 34. For example, monitor port 44 is positioned centrally of the lining near its upper edge. Monitor ports 46 and 48 are positioned at the opposite ends of cross channel 40 adjacent the leading end of the lining and respectively adjacent the upper and lower edges of the lining, and monitor ports 50 and 52 are similarly positioned with regard to cross channel 42. Thus, the monitor ports are positioned at points where lining wear is most likely to be of concern. Each monitor port extends into the lining to a depth somewhat greater than the channels, and is formed as a recess with the bottom 54 thereof being at a predetermined spacing from the friction braking surface 56 of the lining. The distance between the friction braking surface 56 and the bottom 54 of each monitor port is equal to the desired amount of the lining wear beyond which it is desired to energize the warning indicator so that the vehicle operator is aware that the worn lining should be replaced. The lining is suitably secured to the backing plate by rivets 58 and is held sufficiently tightly thereagainst in sealing relation so as to normally permit the channel and monitor ports to be at the vacuum pressure of the conduits connected thereto. Alternatively, or additionally, the lining may be bonded to the backing plate.

The vacuum circuit 12 includes each brake shoe assembly's channels, monitor ports, and supply tube, with each supply tube being connected by conduits such as conduit 36 to trunk conduits 60 and 62. These conduits are connected to the air filter 64 from which conduit 66 leads to the vacuum switch 68. The outlet from the vacuum switch is connected to the conduit 70, which is, in turn, connected through a metering orifice 72 to the vacuum source 74. This source is preferably the engine intake manifold of the vehicle on which the brakes were installed.

The electrical circuit 14 includes a source of electrical energy such as battery 76, the ignition switch 78, and a warning indicator 80 connected in series with the vacuum switch 68 by electrical lead 82. Thus, when switch 78 is closed and when the vacuum switch 68 closes due to lack of vacuum in the vacuum circuit, the warning indicator 80 is energized. This indicator may be a warning lamp or a buzzer, for example.

Under normal operation, with the engine not running, vacuum switch 68 is closed since there is no vacuum in the vacuum circuit 12. When ignition switch 78 is closed, the warning indicator 80 will show that the electrical circuit is operative. When the engine starts, vacuum will be impressed in the vacuum circuit, opening vacuum switch 68, and the warning indicator 80 will be deenergized. This will indicate that the vacuum circuitry is operative. When any brake lining monitor port is open to atmosphere due to lining wear through to the monitor port, the vacuum circuit 12 will be at atmospheric pressure, the vacuum switch 68 will be closed, and indicator 80 will be energized. It will remain energized so long as ignition switch 78 is closed until the vacuum circuit is again sealed by the replacement of the worn lining.

What I claim is:

1. A brake lining wear warning system comprising;
 a brake pad assembly having a lining backing plate and a lining secured thereto, said lining having a braking surface adapted to frictionally engage a member to be braked,
 normally closed passage means in said lining having originally predetermined spacing from said braking surface equal to the predetermined amount of lining wear allowable after which said warning system is to be activated, said passage means being opened by lining wear beyond the allowable amount at any point wherein said passage means is positioned at the originally predetermined spacing,
 conduit means fluid connecting said passage means to vacuum switch and a vacuum source,
 an electrical circuit having therein said vacuum switch and a source of electrical energy and a warning indicator controlled by actuation of said vacuum switch to be energized when said vacuum switch is actuated in response to a less than predetermined minimum vacuum in said conduit means at said vacuum switch.

2. The brake lining wear warning system of claim 1,
 said passage means comprising at least one channel formed in the surface of said lining opposite said braking surface and closed by said lining backing plate.

3. The brake lining wear warning system of claim 2, said passage means further comprising a plurality of monitor ports formed as recesses extending further into said lining than said at least one channel and terminating at said originally predetermined spacing from said braking surface.

4. The brake lining wear warning system of claim 3, said monitor ports being positioned at leading and trailing and intermediate portions of said lining.

5. The brake lining wear warning system of claim 1, said conduit means further having an air filter therein fluidly intermediate said lining and said vacuum switch to prevent lining particles from passing to said vacuum switch and beyond.

6. The brake lining wear warning system of claim 1, said conduit means further having a metering orifice therein intermediate said vacuum switch and said vacuum source for insuring a minimum pressure differential between said vacuum source and said vacuum switch upon opening of said normally closed passage means.

7. The brake lining wear warning system of claim 1, said electrical circuit including a vehicle engine ignition switch and said vacuum source being the intake manifold of the vehicle engine whereby when said ignition switch is closed said warning indicator is energized until sufficient vacuum is generated to open said vacuum switch, thereby providing a test of said system.

8. A vehicle brake lining wear warning system comprising:
a brake pad assembly including,
   a brake lining backing plate having a brake lining secured thereto, said lining having one surface engaging said backing plate and an opposite surface adapted to frictionally engage a member to be braked,
   channel passages found in said lining one surface in fluid intercommunication and extending into said lining toward said opposite surface and being closed from the ambient atmosphere by said backing plate,
   and a plurality of monitor ports formed in said lining as recesses in fluid communication with said channel passages and extending toward said opposite surface, the closed ends of said recesses being spaced from said opposite surface by a predetermined lining wear allowable thickness;
a vacuum operated first switch having a normally closed position and opened by a predetermined vacuum impressed thereon, an electrical circuit having therein in series said vacuum switch, a source of electrical energy, a warning indicator, and a second switch normally closed during starting and running of the vehicle engine; a vacuum source comprising the intake manifold of the vehicle engine;
and conduit means fluid connecting said channel passages and said first switch and said vacuum source;
   said warning indicator being energized when said second switch is closed and said first switch has insufficient vacuum imposed thereon to be opened, said channel passages and said conduit means and said first switch being subjected to substantially atmospheric pressure and therefore insufficient vacuum to open said first switch when said lining is worn to open at least one of said monitor ports to atmosphere as well as when the vehicle engine is not operating and no vacuum is being produced in said intake manifold.